C. T. ELLISTON.
Bee-Hives.
No. 148,554.
Patented March 17, 1874.
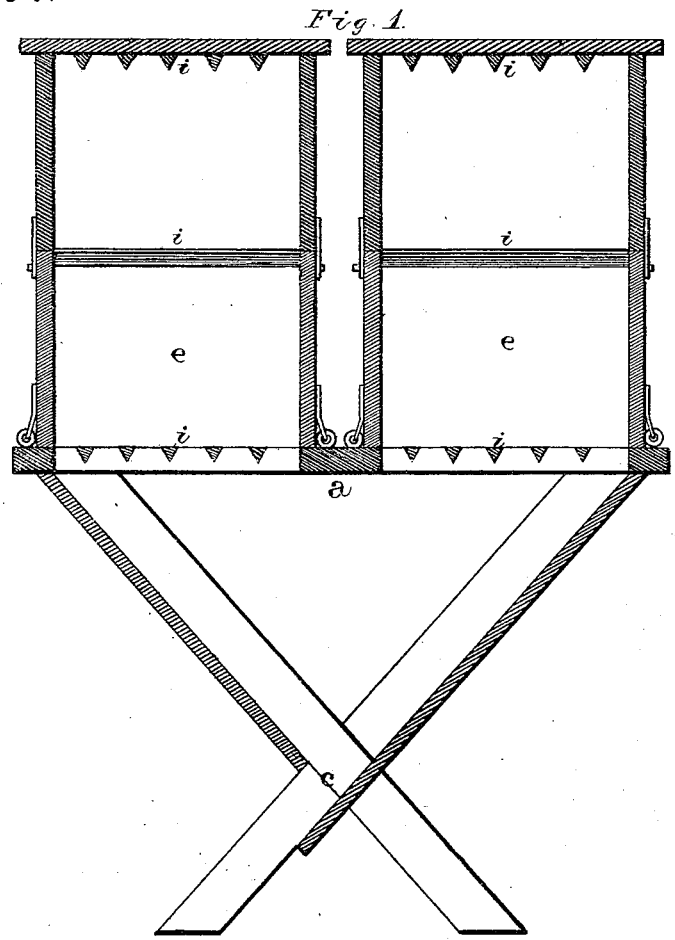
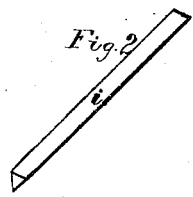
WITNESSES.
H. K. Duhamel
Alex S Davidson
INVENTOR
Chas. T. Elliston
Per H. S. Abbot
Attorney.

UNITED STATES PATENT OFFICE.

CHARLES T. ELLISTON, OF CLINTON, MISSOURI.

IMPROVEMENT IN BEE-HIVES.

Specification forming part of Letters Patent No. 148,554, dated March 17, 1874; application filed June 14, 1873.

*To all whom it may concern:*

Be it known that I, CHAS. T. ELLISTON, of Clinton, county of Henry and State of Missouri, have invented certain new and useful Improvements in Bee-Hives, of which the following is a specification:

The nature of my invention relates to an improvement in bee-hives; and it consists in the construction of the bench so as to prevent the swarming of the bees, and the arrangement of the honey-boxes above, as will be more fully described hereafter.

Figure 1 is a vertical section of my hive through two of the boxes. Fig. 2 is a perspective of the triangular slat.

*a* represents the bench, supported upon legs which are crossed, so as to form a chamber increasing in size toward the top, and having the opening *c* for the bees at the bottom. Upon the top of this bench there are placed four or more honey-boxes, *e*, of any desired shape or size, each one being composed of two or more sections of the same area throughout, so that they can be interchanged at will and secured together by small hooks. Across the top of each section of the boxes, and across the openings through the top of the bench, are placed a number of triangular bars, *i*, upon which the bees build their combs, all of which are removable, so that the comb can be lifted out without the slightest trouble, and which form the top and bottom of each section.

When the hive is set up, but a single colony of bees is placed in one of the boxes, so that when they swarm from time to time, instead of the new colonies leaving the hive, they go into the other honey-boxes until these are all full. Three new benches are then to be set up, and one section of a box taken from the old hive to each of the new benches, upon each of which there are empty honey-boxes, as in the first instance.

By the above-described system of arranging the sections, by driving the bees from the top one it can be taken away, so that the honey can be quietly removed, and then the lower one is raised up so as to come on top, and an empty section placed underneath, and thus the bees will be made to build from the top toward the bottom, so that the honey can always be used or taken away in regular order, and so that the comb will never have time to get old.

Having thus described my invention, what I claim as new, and desire to secure by Letters Patent, is—

The hive herein described, having the triangular chamber under the bench *a*, and the honey-boxes *e* above the same, said honey-boxes being made in removable sections, and provided with the triangular bars *i*, as shown and described, for the purpose specified.

In testimony that I claim the foregoing as my invention I hereunto affix my signature this 11th day of June, 1873.

C. T. ELLISTON.

Witnesses:
W. K. DUHAMEL,
ALEX. S. DAVIDSON.